(12) United States Patent
Gulsun et al.

(10) Patent No.: US 8,675,940 B2
(45) Date of Patent: Mar. 18, 2014

(54) GENERATION OF MOVING VASCULAR MODELS AND BLOOD FLOW ANALYSIS FROM MOVING VASCULAR MODELS AND PHASE CONTRAST MRI

(75) Inventors: Mehmet Akif Gulsun, Lawrenceville, NJ (US); Andreas Greiser, Erlangen (DE); Jens Guehring, Erlangen (DE); Arne Littmann, Erlangen (DE); Edgar Müller, Heroldsbach (DE)

(73) Assignee: Siemens Aktiengesellschaft, München (DE)

( * ) Notice: Subject to any disclaimer, the term of this patent is extended or adjusted under 35 U.S.C. 154(b) by 273 days.

(21) Appl. No.: 12/911,829

(22) Filed: Oct. 26, 2010

(65) Prior Publication Data

US 2011/0103665 A1 May 5, 2011

Related U.S. Application Data

(60) Provisional application No. 61/255,242, filed on Oct. 27, 2009.

(51) Int. Cl.
*G06K 9/00* (2006.01)
(52) U.S. Cl.
USPC .......................................................... 382/131
(58) Field of Classification Search
CPC ....................... G06T 2207/30104; G06T 17/20
See application file for complete search history.

(56) References Cited

PUBLICATIONS

Stalder et al., "Quantitative 2D and 3D Phase Contrast MRI: Optimized Analysis of Blood Flow and Vessel Wall Parameters", Magnetic Resonance in Medicine, 60:1218-1231 (2008).*
Fielden et al., "A New Method for the Determination of Aortic Pulse Wave Velocity Using Cross-Correlation on 2D PCMR Velocity Data", Journal of Magnetic Resonance Imaging, 27:1382-1387 (2008).*
Mark et al., "Estimation of Global Aortic Pulse Wave Velocity by Flow-Sensitve 4D MRI", Magnetic Resonance in Medicine 63:1575-1582 (2010).
Stalder et al., "Quantitative 2D and 3D Phase Contrast MRI: Optimized Analysis of Blood Flow and Vessel Wall Parameters", Magnetic Resonance in Medicine, 60: 1218-1231 (2008).

* cited by examiner

*Primary Examiner* — Stephen R Koziol
*Assistant Examiner* — Timothy Choi
(74) *Attorney, Agent, or Firm* — Donald B. Paschburg; F. Chau & Associates, LLC

(57) ABSTRACT

A method of deriving blood flow parameters from a moving three-dimensional (3D) model of a blood vessel includes determining a reference vascular cross-sectional plane through a location of a lumen in a moving 3D model of the blood vessel at one time within the model, determining a plurality of target vascular cross-sectional planes at multiple times via temporal tracking of the reference plane based on a displacement field, determining a plurality of contours based on an intersection of the target vascular cross-sectional planes with the moving 3D vessel model at multiple times within the model, and determining a blood flow parameter of the vessel from intersections of each contour of a given one of the times with a phase contrast magnetic resonance (PC-MRI) image of the blood vessel from the corresponding time.

16 Claims, 13 Drawing Sheets

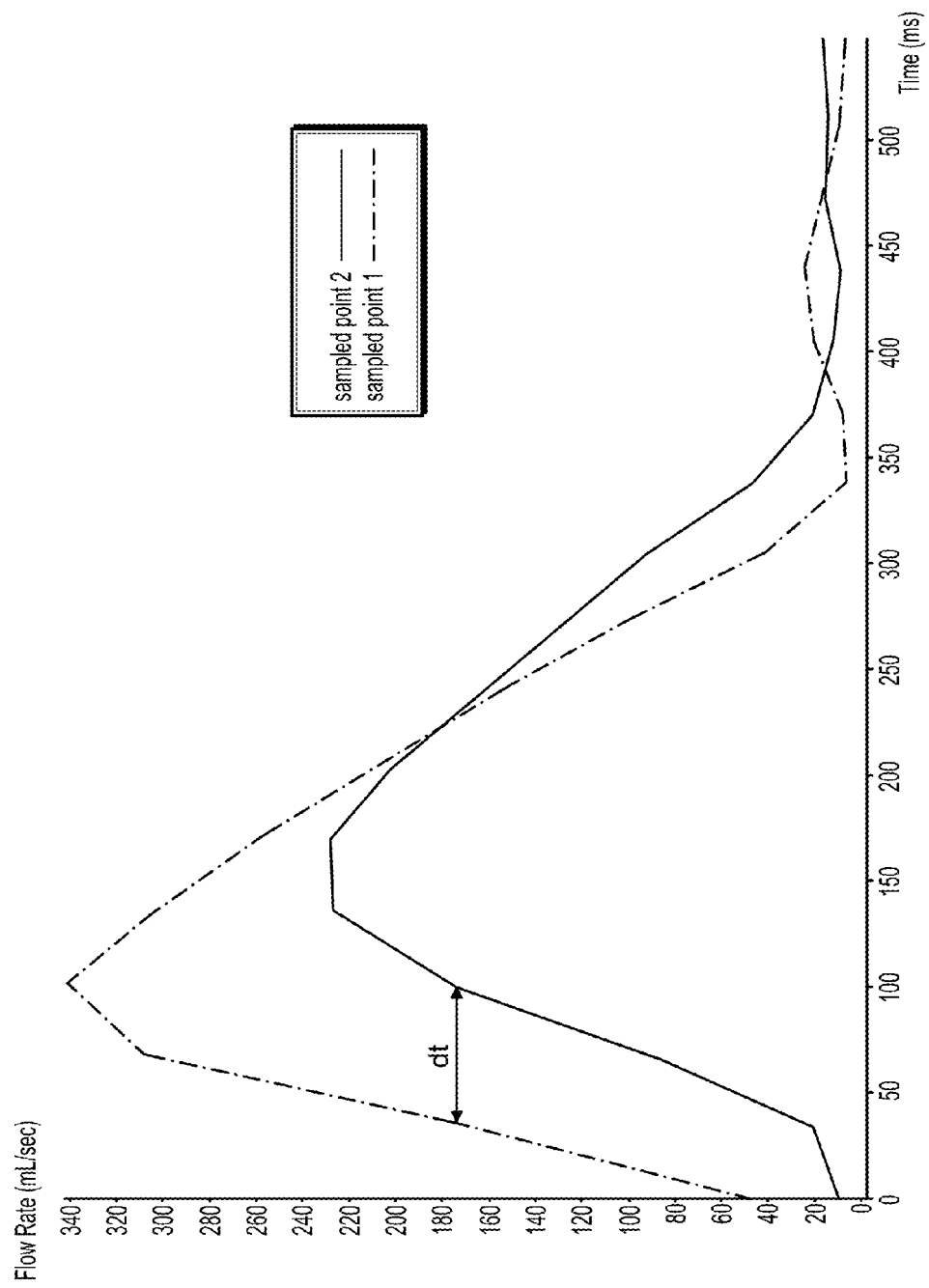

GENERATION OF MOVING VASCULAR MODELS AND BLOOD FLOW ANALYSIS FROM MOVING VASCULAR MODELS AND PHASE CONTRAST MRI

CROSS-REFERENCE TO RELATED APPLICATIONS

This application claims priority to U.S. Provisional Application No. 61/254,242, filed on Oct. 27, 2010, the disclosure of which is incorporated by reference herein.

BACKGROUND OF THE INVENTION

1. Technical Field

The present disclosure relates generally to generation of vascular models and analysis of blood flow, and more particularly, to generation of moving vascular models and analysis of blood flow using the moving vascular models and time-resolved Phase Contrast MRI.

2. Discussion of Related Art

Functional analysis of the human cardiovascular system is part of clinical diagnosis. In this respect, the assessment of blood flow is gaining importance as being an important estimator of cardiovascular problems. The majority of flow measurements are currently done in single imaging planes. However, single plane measurements have limitations when multiple samplings are required from multiple locations of the vascular system, since they are time consuming and lack high reproducibility over time.

Recent developments in flow imaging permit for three-dimensional acquisition of time-resolved phase contrast (PC)-MRI with three-directionally encoded velocities. The high-dimensional datasets acquired from such flow-sensitive four-dimensional (3 spatial dimensions+time) MRI techniques provide spatial and temporal coverage of the vascular region of interest. For example, these techniques allow for analyzing complex, secondary blood flow characteristics such as helices and vortices, as well as for deriving quantitative parameters by sampling at multiple locations resulting in dense and reproducible measurements.

However, analysis of blood flow using flow-sensitive time-resolved PC-MRI is still a challenging task due to noise and resolution of the datasets, and also anatomical motion caused by heart beat and breathing. An accurate definition of the intended vascular boundary and its temporal behaviour throughout the heart cycle are necessary for accurate derivation of quantitative flow parameters. In addition, the analysis process is required to be timely and efficient in order to be feasible in a real clinical setting.

Thus, there is a need for more efficient and accurate methods and systems to generate vascular models and perform blood flow analysis.

SUMMARY OF THE INVENTION

According to an exemplary embodiment of the invention, a method of generating a moving three-dimensional (3D) model of a blood vessel includes segmenting one of a plurality of time-series images of a blood vessel to generate a three-dimensional (3D) model of the blood vessel, performing a deformable image registration on the images to generate a displacement field, and generating a moving model of the blood vessel from the 3D model and the displacement field.

According to an exemplary embodiment of the invention, a method of deriving blood flow parameters from a moving three-dimensional (3D) model of a blood vessel includes determining a reference vascular cross-sectional plane through a location of a lumen in a moving 3D model of the blood vessel at one time within the model, determining a plurality of target vascular cross-sectional planes at multiple times via temporal tracking of the reference plane based on the displacement field, determining a plurality of contours based on an intersection of the target vascular cross-sectional planes with the moving 3D vessel model at multiple times within the model, and determining a blood flow parameter of the vessel from intersections of each contour of a given one of the times with a phase contrast magnetic resonance (PC-MRI) image of the blood vessel from the corresponding time.

BRIEF DESCRIPTION OF THE DRAWINGS

Exemplary embodiments of the invention can be understood in more detail from the following descriptions taken in conjunction with the accompanying drawings in which:

FIGS. 7a and 7B are used to illustrate a pulse wave velocity calculation from two sampled locations according to an exemplary embodiment of the invention.

DETAILED DESCRIPTION OF EXEMPLARY EMBODIMENTS

In general, exemplary embodiments of systems and methods for generating vascular models and performing blood flow analysis are discussed in further detail with reference to FIGS. 1-9. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

At least one embodiment of the present invention integrates a semi-automatic 3D vascular modelling technique with an automated deformable registration technique for temporal propagation of vascular models across several time frames. The 3D dynamic (moving) vascular models obtained from this method can be used to automatically and efficiently position analysis planes at densely sampled points along a vascular center line and automatically extract vascular cross-sectional boundaries from the intersection of the analysis planes with the vascular model, which improves the objectivity of the assessment. Moreover, temporal correspondence of the analysis planes is achieved by tracking them using the displacement fields derived via deformable registration resulting in more accurate measurements.

Figure 1:
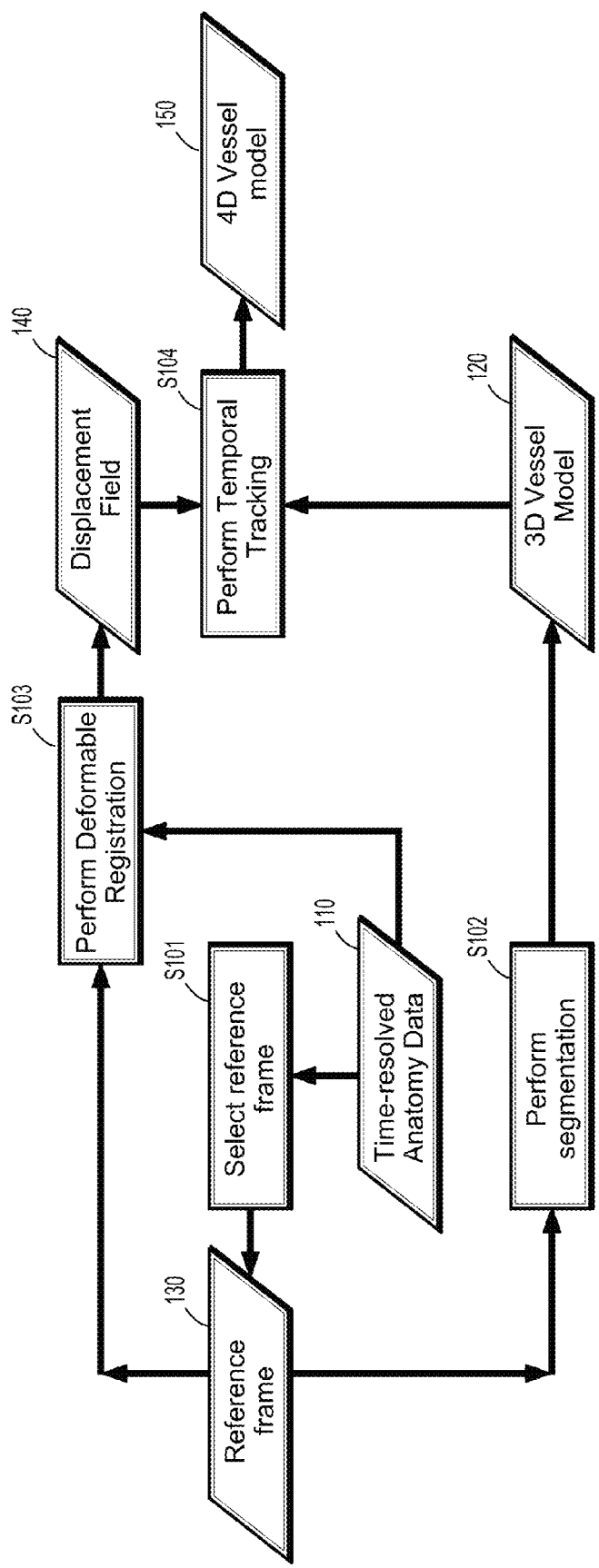
FIG. 1 illustrates a method of generating a temporal model of a vessel according to an exemplary embodiment of the invention.

FIG. 1 illustrates a method of generating a 3D temporal (4D) model of vessels according to an exemplary embodiment of the invention. FIG. 1 will be discussed below along with FIG. 2, which illustrates exemplary time-resolved anatomy data that may be operated on by the method of FIG. 1.

Figure 2:
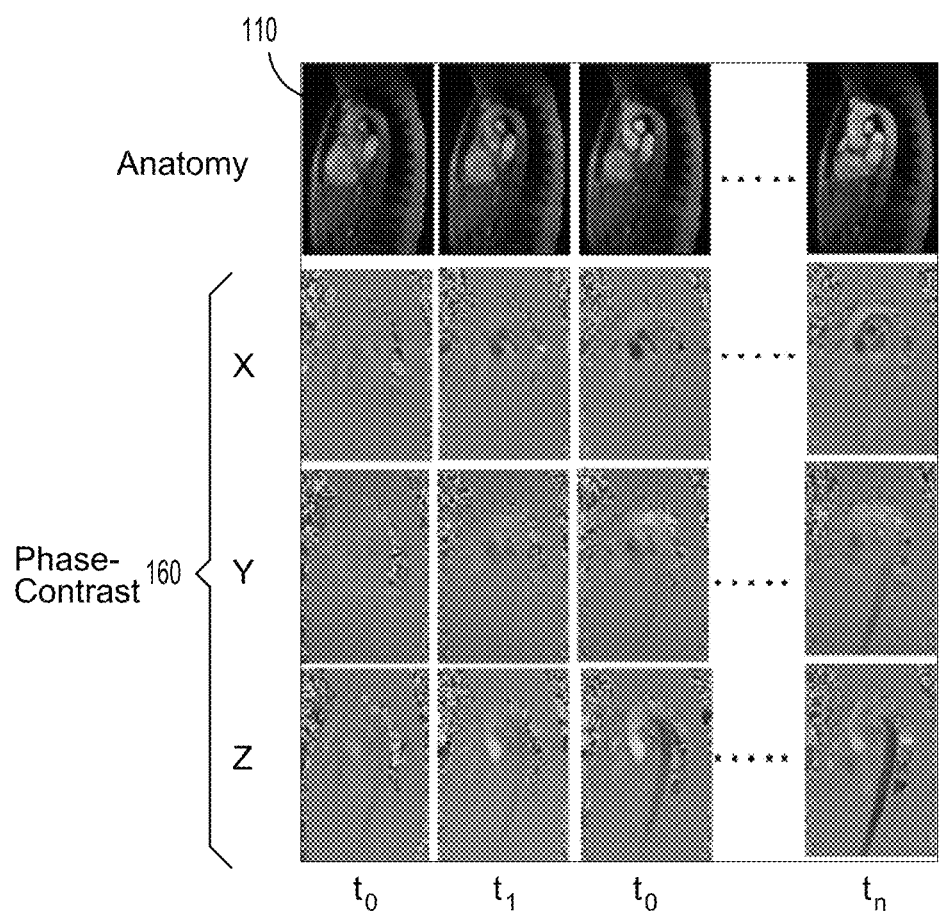
FIG. 2 illustrates exemplary time-resolved anatomy data that may be operated on by the method of FIG. 1 and corresponding exemplary phase contrast (PC-MRI) datasets that may be operated on by the methods of FIG. 4 below.

Referring to FIG. 1 and FIG. 2, the method includes selecting a reference frame 130 from time resolved anatomy data 110 (S101), performing a segmentation on the reference frame to generate a 3D vessel model 120 (S102), performing a deformable registration on the time-resolved anatomy 110 using the reference frame 130 to generate a displacement field 140 (S103), and performing a temporal tracking of the 3D vessel model 120 using the displacement field 140 to generate a temporal 3D (4D) vessel model 150 (S104).

The segmentation is performed on a single reference frame, which may be the same or different from the reference frame used to perform the deformable registration. When the reference frame used to perform the deformable registration is different from the reference frame used to perform the segmentation, the registration may be referred to as symmetric deformable registration. Symmetric deformable registration allows for tracking models segmented from any frame. For example, the vessel segmentation can be done in the frame where the anatomy is most visible. The displacement field generated by symmetric deformable registration is a bi-directional displacement field that allows one to track models, which are segmented from any time frame across all the entire time frames (e.g., t0, t1, tn). For example, after performing a symmetric registration with reference time frame t2, a model segmented from time t0 can then be first tracked to time frame t2 and then the tracked model at time point t2 can be tracked across the entire time-series to generate a complete moving model. Therefore, the vessel can be segmented from any time frame independent from the reference time frame used for symmetric deformable registration.

When the reference frame used to perform the deformable registration is the same as the reference frame used to perform the segmentation, the registration may be referred to as non-symmetric deformable registration. The displacement field generated by non-symmetric deformable registration is a one-directional displacement field, which only allows for tracking models segmented from the reference time frame across the entire time frames (e.g., t0, t1, tn). For example, after performing a non-symmetric registration at a reference time frame t2, a model segmented from time t0 can not be tracked to any other time frame. Therefore, the vessel needs to be segmented from the time frame, which is also used as the reference time frame for non-symmetric deformable registration. The segmentation may be performed independently of the deformable registration. For example, the deformable registration could occur before the segmentation.

Figure 3:
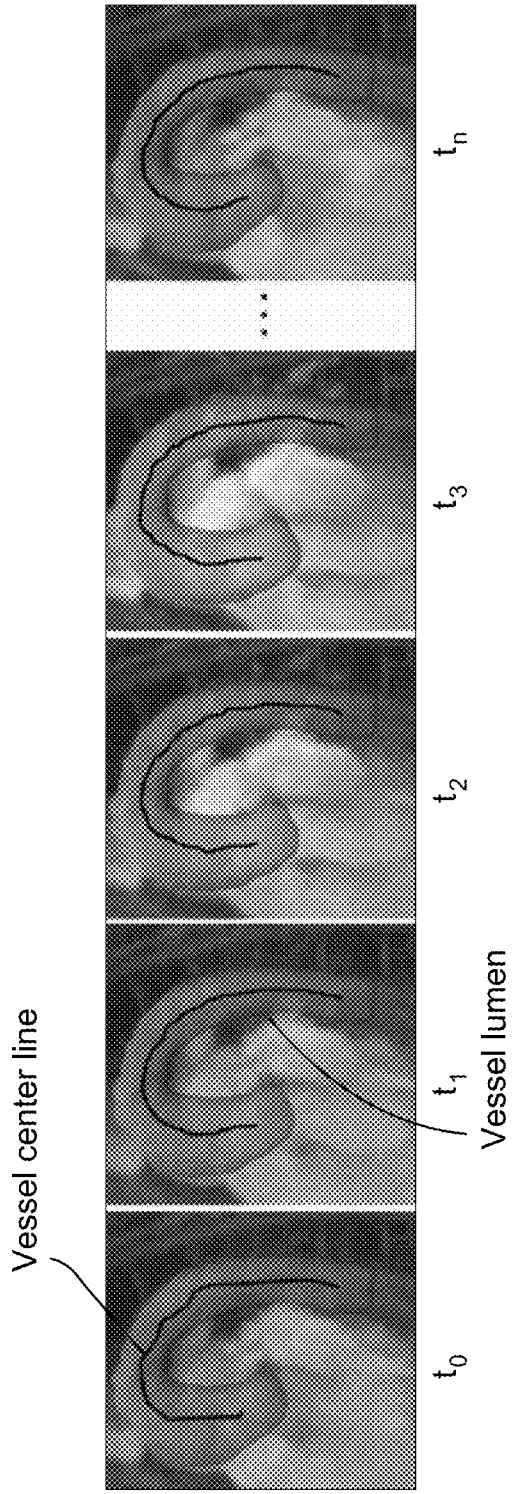
FIG. 3 illustrates exemplary snapshots of a temporal vessel model during different time periods.

As illustrated in FIG. 2, the time-resolved anatomy data 110 (see first row) are 3D images of a part of the body, which include at least one blood vessel, and which have been captured at different periods of time (e.g., $t_0, t_1, t_2, \ldots, t_n$). The 3D images are acquired from the magnitude information of a MRI signal. Referring to FIG. 1, the 3D vessel model 120 output by the segmentation delineates lumen of the blood vessels of the anatomy data 110 and the center lines of the blood vessels. For example, the lumen or boundary of each vessel may have a distinct color relative to the surrounding background and each center line may have a distinct color relative to the surrounding lumen. The reference frame 130 refers to one of the 3D images of the time-resolved anatomy 110 captured at one point in time (e.g., $t_0, t_1$, or $t_2$, etc.). The displacement field 140 includes transformations (e.g., differences in orientation and distance) between the reference frame 130 and the images of the time-resolved anatomy data 110. The 3D temporal (4D) vessel model 150 is a moving image of the vessels generated from the time-resolved anatomy data 110. FIG. 3 illustrates exemplary snapshots of the 3D temporal (4D) vessel model 150 during different time periods (e.g., $t_0, t_1, t_2, \ldots, t_n$). While FIG. 3 illustrates that the vessel is the aorta, embodiments of the present invention are not limited to any particular vessel.

The vessel segmentation performed (e.g., see step 101) may be a semi-automatic process. For example, a user can place seed points on the frames of the time-resolved anatomy data 110 and center lines of the vessels may then be automatically detected between the user-placed seed points. Next, the vascular lumens (e.g., the boundaries) of the vessels can be automatically extracted using the detected center lines. Alternately, the vessel segmentation may be performed in a completely automatic manner using a classifier trained to identify vessels and vessel center lines.

The deformable registration performed (e.g., see step 103) is a technique for modifying a deformable image (e.g., the images of the time-resolved anatomy data 110) in an elastic way to match similar features in a reference image (e.g., the reference frame 130). This technique includes determining a transformation necessary to register (e.g., to align) two images (e.g., an image of the time-resolved anatomy data 110 and the reference frame 130) by matching structures of interest in the deformable image with structures of interest within the reference image (e.g., vessels). The matching process includes deforming the deformable image to achieve alignment of these structures within the two images. Various deformation algorithms may be used to perform the deformable registration. For example, one of these deformation algorithms is referred to as the demons algorithm, whose steps can be performed quite rapidly.

Figure 4A:
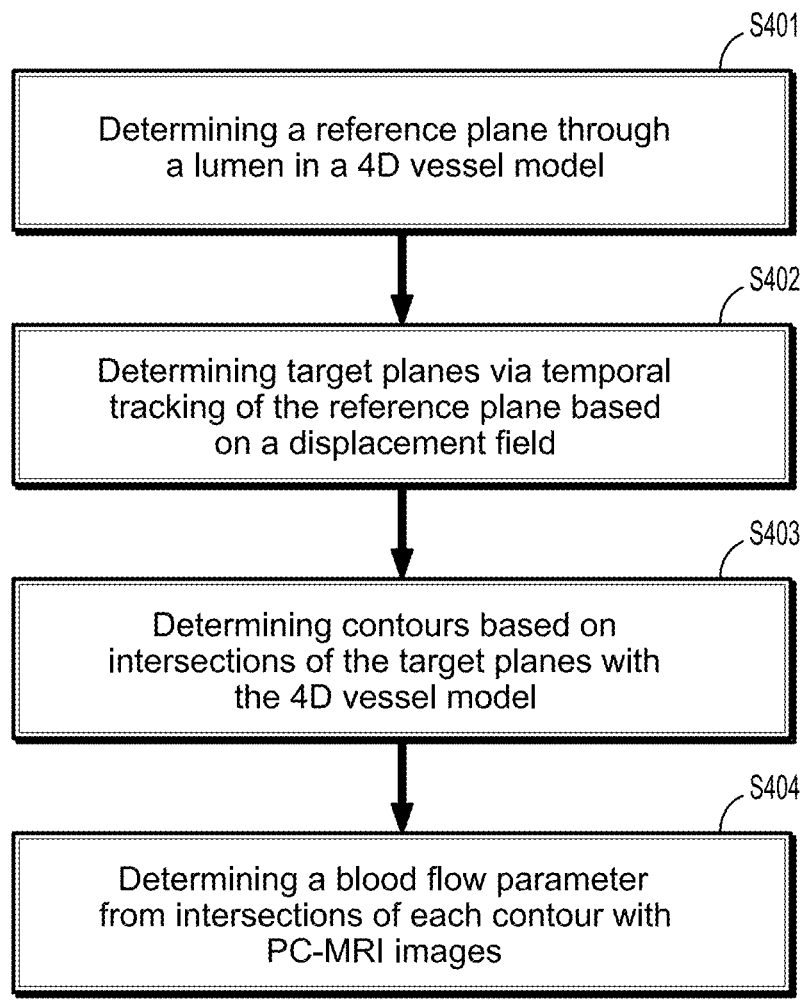
FIG. 4a illustrates a high-level flow-chart of a method of determining blood flow parameters of vessels of a temporal vessel model, according to an exemplary embodiment of the invention.
Figure 4B:
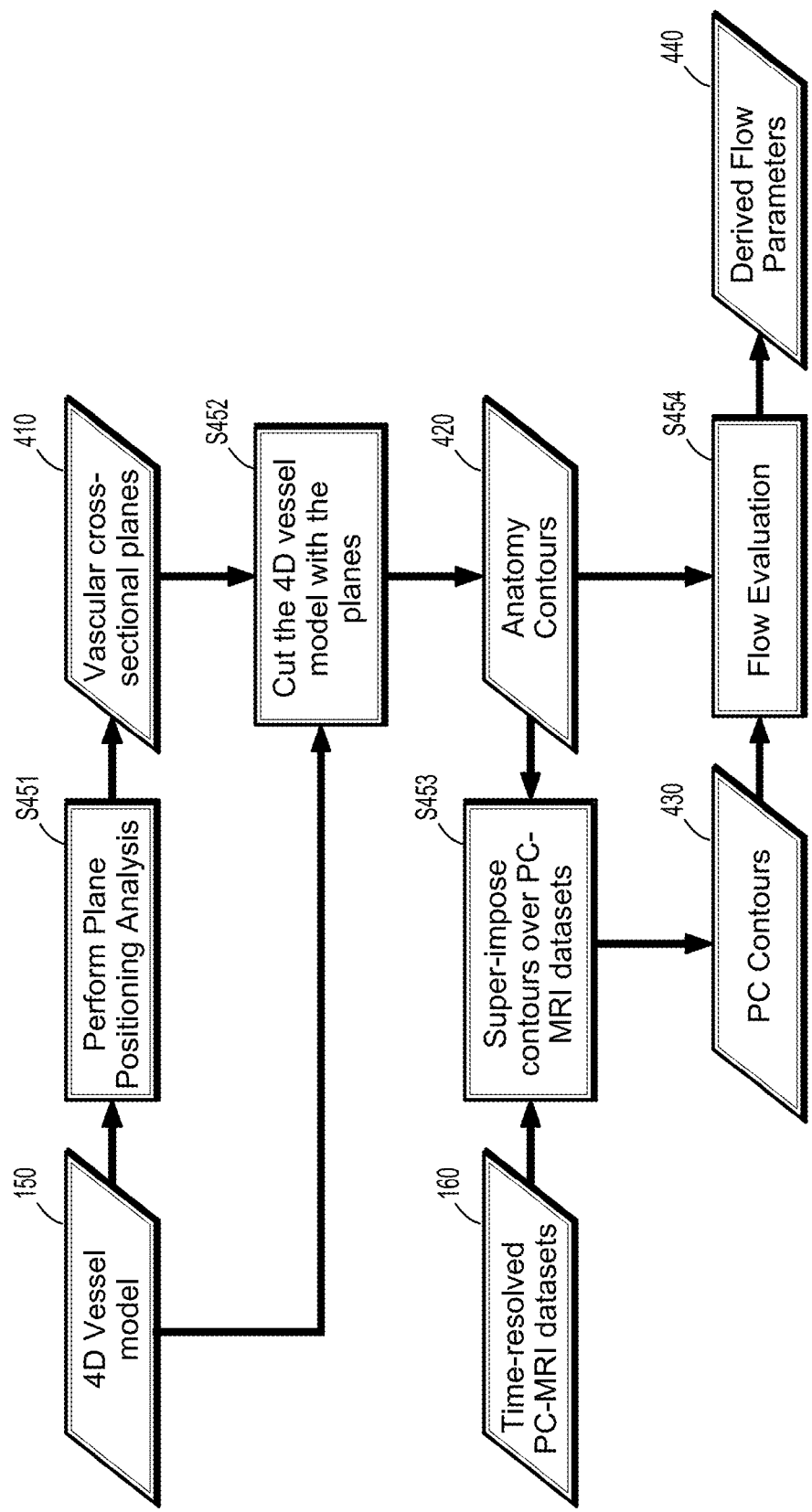
FIG. 4b illustrates the method of FIG. 4a in more detailed manner, according to an exemplary embodiment of the invention.

FIG. 4a is a high-level flow-chart of a method of deriving blood flow parameters from a moving 3D (4D) vessel model. Referring to FIG. 4a, the method includes determining a plurality of vascular cross-sectional planes through a blood vessel of a moving 3D (4D) vessel model (S401), determining a plurality of first contours based on an intersection of the planes with the blood vessel (S402), determining a plurality of second contours within phase contrast magnetic resonance (PC-MRI) images of the blood vessel based on the first contours (S403), and determining a blood flow parameter of the vessel from the first and second contours (S404). FIG. 4b illustrates the method of FIG. 4a in a more detailed manner according to an exemplary embodiment of the invention. FIG. 4b will be discussed below along with FIG. 2, which illustrates exemplary time-resolved PC-MRI images (datasets) 160 that may be operated on by the methods of FIGS. 4a and 4b.

The PC-MRI datasets 160 are derived from the same MRI signal that was used to derive the time-resolved anatomy data 110. Each column of FIG. 2 includes the PC-MRI datasets 160 and the time-resolved anatomy data 110 that were derived from a same MRI signal captured during a same period of time. For example, an MRI scan may have been performed over the aorta at a first time to generate a first MRI signal, and the first column of the time-resolved data 110 and the first column of the PC-MRI datasets 160 would have both been derived from the same first MRI signal. While the images of the time-resolved data 110 are derived from magnitude information of the MRI signal, the images of the PC-MRI datasets 160 are derived from phase information of the MRI signal. In a PC-MRI image, static tissues such as muscle or bone will subtract out, and moving tissues such as blood acquire a different phase since they move constantly through a gradient. The PC-MRI datasets 160 at each point in time include three separate images, a first one for the x-component of the phase information, a second one for the y-component of the phase information, and a third one for the z-component of the phase information. The three separate image acquisitions in all three directions (e.g., X, Y, and Z) are used to give a more complete image of blood flow.

Referring to FIG. 4b and FIG. 2, the method includes performing a plane positioning analysis on the 3D temporal (4D) vessel model 150 to generate vascular cross-sectional planes 410 (S451), cutting the temporal model 150 with the planes 410 to generate anatomy contours 420 (S452), superimposing the anatomy contours 420 over the time-resolved PC-MRI datasets 160 to generate intersections (e.g., PC-contours 430) (S453), and performing a flow evaluation on the PC-contours 430 to derive blood flow parameters 440 (S454).

The vascular cross-sectional planes 410 may be derived during the plane positioning analysis (see step S451) by automatically sampling points along center lines of vessels within the temporal vessel model 150 at different time points. The cross-sectional plane perpendicular to a centerline location can be derived by calculating the tangent of the centerline at that location. For example, two points along a center line of an image of a vessel within the temporal vessel model captured during a first time can be sampled to create a line segment, and a plane perpendicular to that line segment can be derived. Two different points along the center line can then be sampled to create a new line segment, and a new plane perpendicular to that new line segment can then be derived. The sampling along the center line of the model can be repeated for the entire length of the vessel to generate additional planes as needed. Then the entire process can be repeated for the images of the model at the other times to generate further planes. Time-variant centerlines of dynamic models have point to point correspondence. This means two analysis planes computed from two different time points but same centerline location correspond to same anatomical view.

Figure 5:
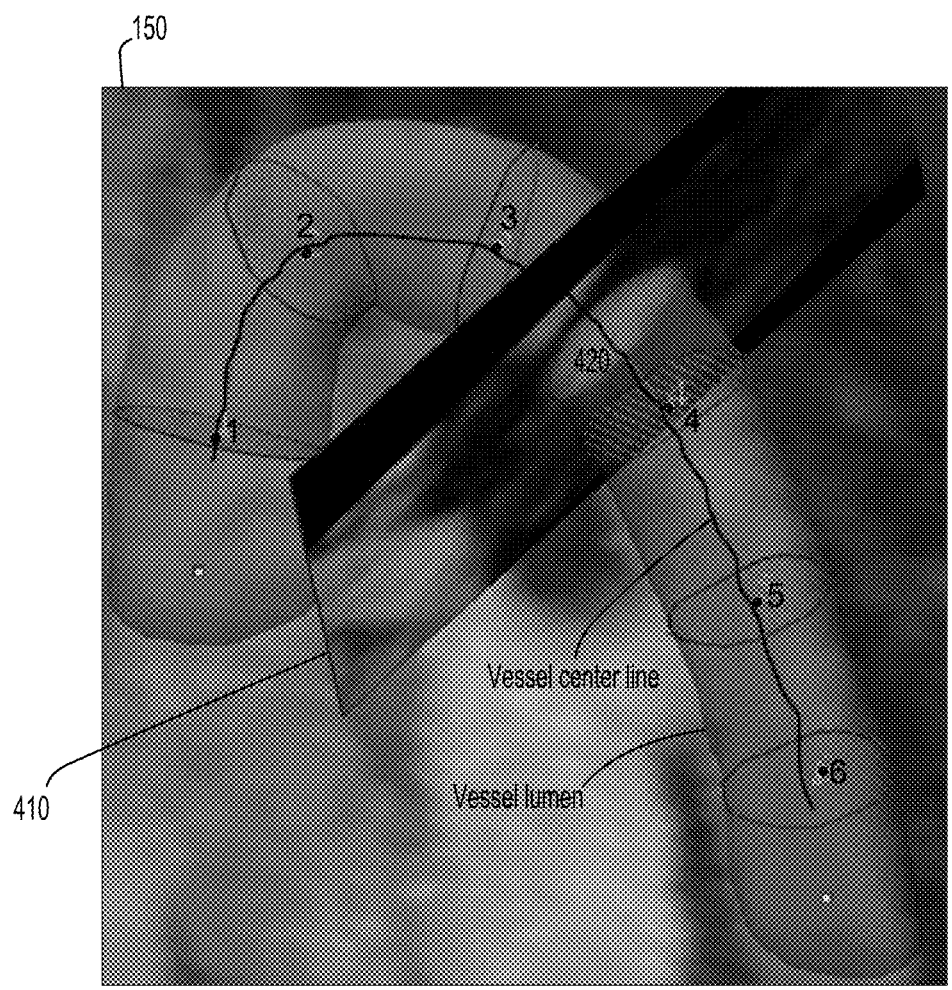
FIG. 5 illustrates an example of a snapshot of a temporal vessel model being cut to generate an anatomy contour according to a step of the method of FIG. 4b.

The anatomy contours 420 may be derived by cutting or intersecting a snapshot of the temporal vessel model 150 at a given time by each of the vascular cross-sectional planes 410 that correspond to that time (see step S452). For example, FIG. 5 shows an example of a snapshot of the temporal vessel model 150 taken at a given time, with an anatomy contour 420 generated by cutting a plane 410 through a vessel (e.g., the aorta) between contours 3 and 4 of contours 1-6, which were previously generated in a similar manner.

Figure 6:
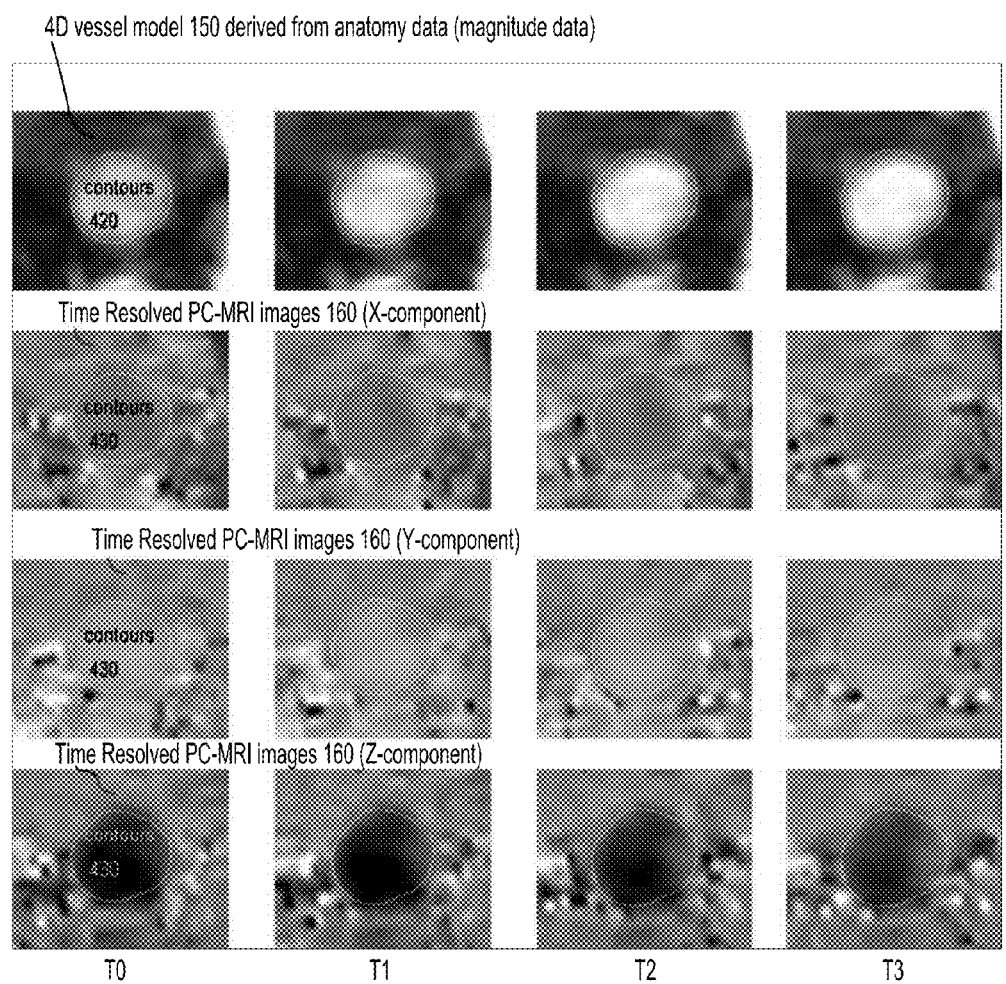
FIG. 6 illustrates exemplary images of PC-MRI datasets taken at four different time periods with their corresponding contours.

The PC-contours 430 may be derived by superimposing the anatomy contours 420 of a given time over images of the time-resolved PC-MRI datasets 160 of the same time (see step S453). For example, FIG. 6 shows exemplary images of the time-resolved PC-MRI datasets 160 taken at four different time periods (e.g., t0-t4), where each includes a corresponding one of the PC-contours.

Blood flow parameters 440 such as blood flow-rate, average/peak velocity profiles, and pulse wave velocity (PWV) may be derived from one or more centerline points of the Anatomy Contours 420 and the PC-contours 430 (see step 454). PWV, which is a measure of aortic stiffness, is an important quantitative flow parameter in vascular research. PWV may be estimated from temporal differences of specific features of blood flow waveforms taken at different spatial locations along the vascular center line. These features may include flow-rate or average velocity waveforms on a vessel cross-sectional plane, or velocity waveforms at the sampled center line locations.

Figure 7A:
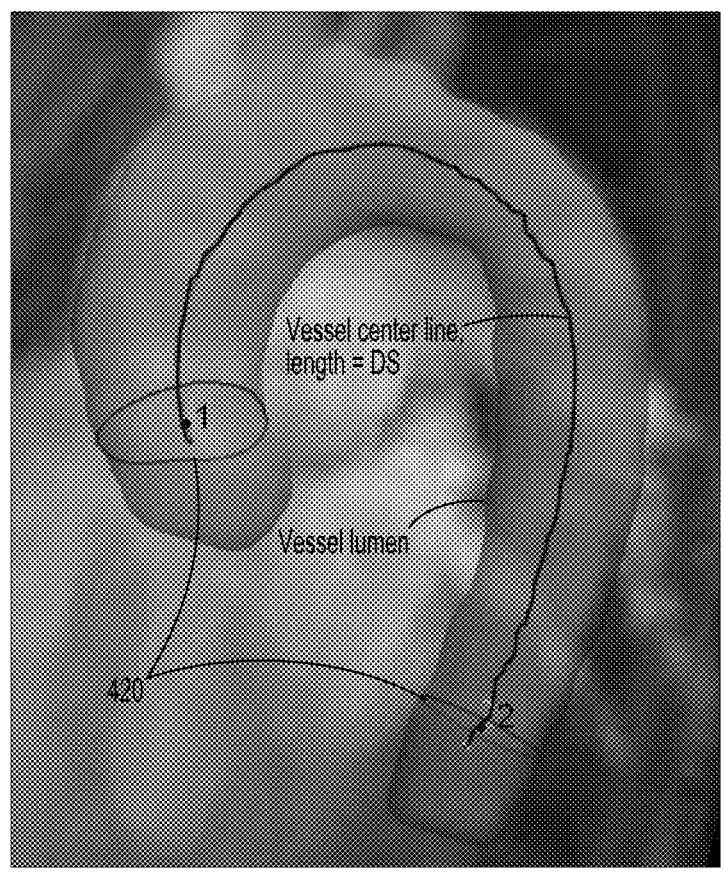

FIGS. 7a and 7B are used to illustrate a pulse wave velocity calculation from two sampled locations (e.g., point 1 and 2). FIG. 7a illustrates two anatomy contours 420 on a snapshot of the temporal vessel model 150 that are centered about the respective samples locations along the centerline of the vessel. The distance between points 1 and 2 may be denoted as ds. The flow rate at each of points 1 and 2 can be calculated from the contours of the x, y, and z images of the PC-MRI datasets 160 corresponding to the anatomy contours 420. FIG. 7B illustrates these flow rates graphically as two separate waveforms and a delay time dt therebetween. The time delay dt between the two waveforms 1 and 2 can be computed from time-to-peak, time-to-foot temporal positions, or from curve matching approaches such as cross-correlation or least square fit techniques. The distance ds is the distance travelled by a pulse wave. The delay time dt is the time for the pulse wave to travel that distance. Pulse wave velocity may be generated by dividing the distance travelled ds by the delay dt (e.g., ds/dt).

Figure 8A:
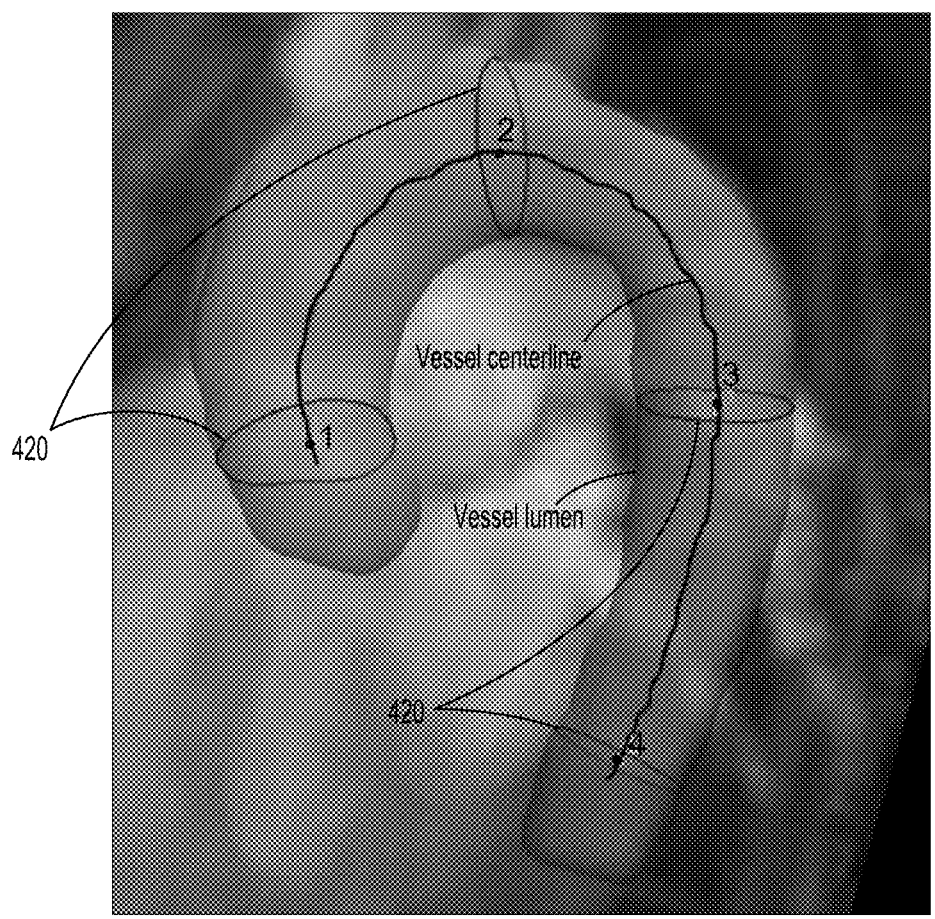
FIG. 8a, FIG. 8b, and FIG. 8c are used to illustrate a pulse wave velocity calculation from more than two sampled locations according to an exemplary embodiment of the invention.
Figure 8B:
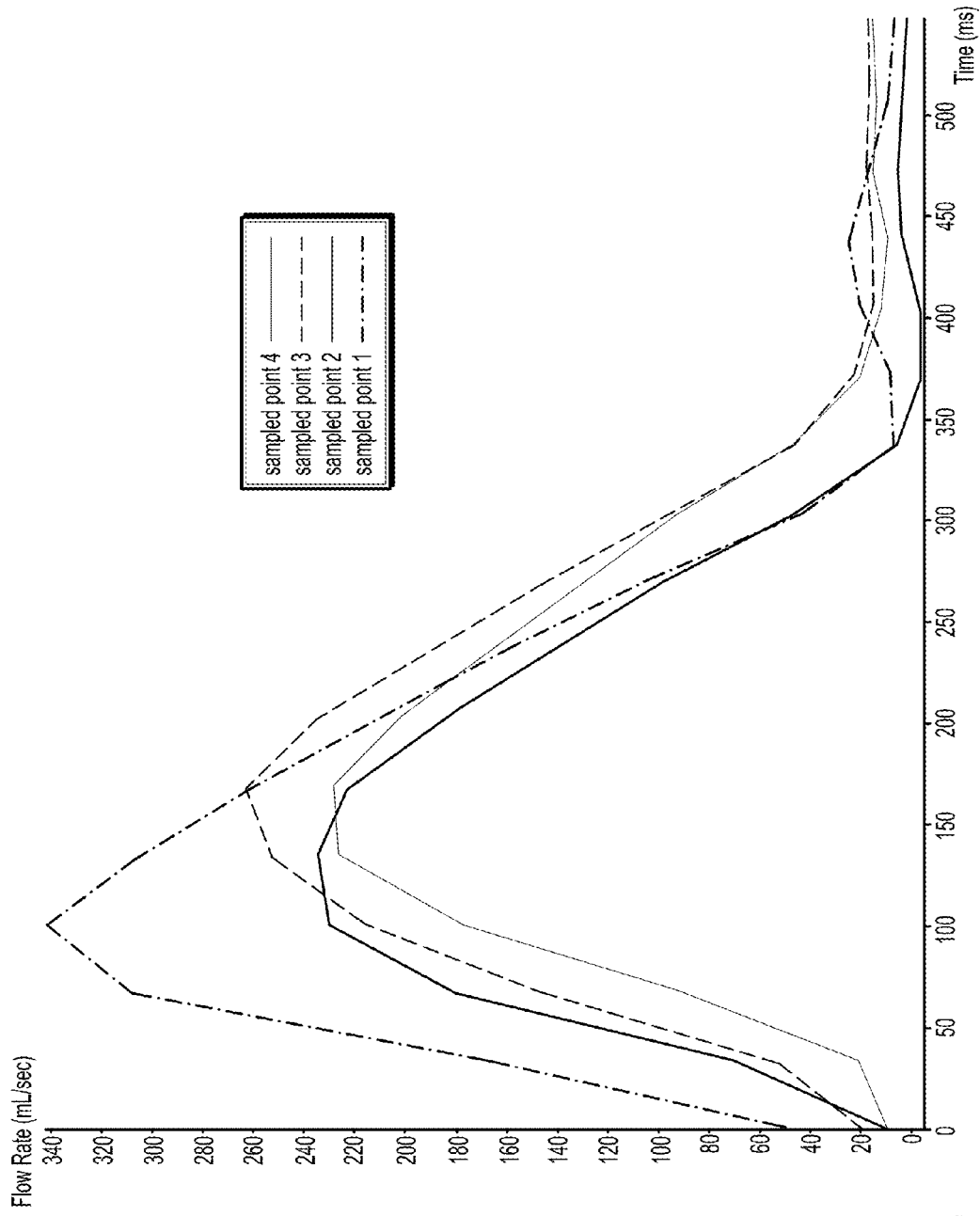
Figure 8C:
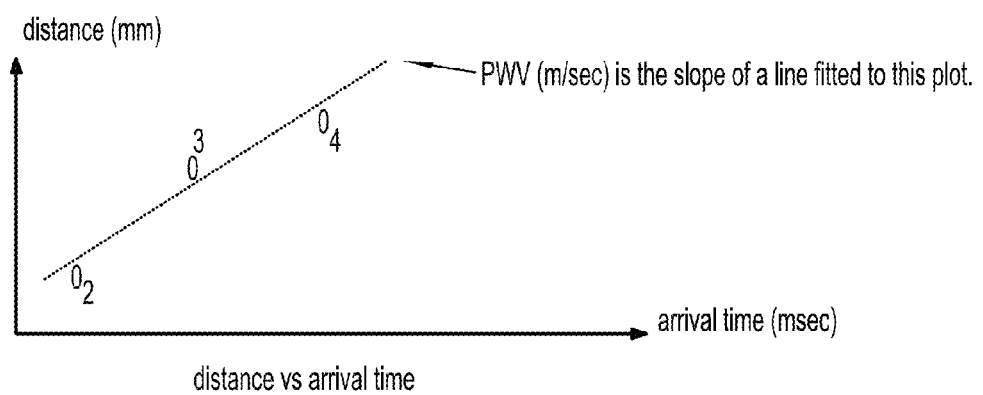

FIG. 8a, FIG. 8b, and FIG. 8c are used to illustrate a pulse wave velocity calculation from more than two sampled locations (e.g., point 1, 2, 3, and 4) along the centerline, which enables a more robust estimate. FIG. 8a illustrates four anatomy contours 420 on a snapshot of the temporal vessel model 150 that are centered about the respective samples locations along the centerline of the vessel. The distance between points 1 and 2 may be denoted as $ds_{1-2}$, the distance between points 1 and 3 may be denoted as $ds_{1-3}$, and the distance between points 1 and 4 may be denoted as $ds_{1-4}$. The flow rate at each of points 1, 2, 3, and 4 can be calculated from the contours of the x, y, and z images of the PC-MRI datasets 160 corresponding to the anatomy contours 420. FIG. 8B illustrates these flow rates graphically as four separate waveforms and a delay times therebetween. For example, the delay time between the first and second waveforms is denoted as $dt_{1-2}$, the delay time between the first and third waveforms is denoted $dt_{1-3}$, and the delay time between the first and fourth waveforms is denoted $dt_{1-4}$. FIG. 8C illustrates the PWV graphically as the slope of a line fitted through a plotting of the distance $ds_{1-x}$ of each waveform (except the first waveform) against its arrival time (time delay $dt_{1-x}$).

Alternate embodiments of the invention may be used to calculate other blood flow parameters such as flow per cardiac cycle, regurgitant flow ratio, resistance index, pulsatility index.

Figure 9:
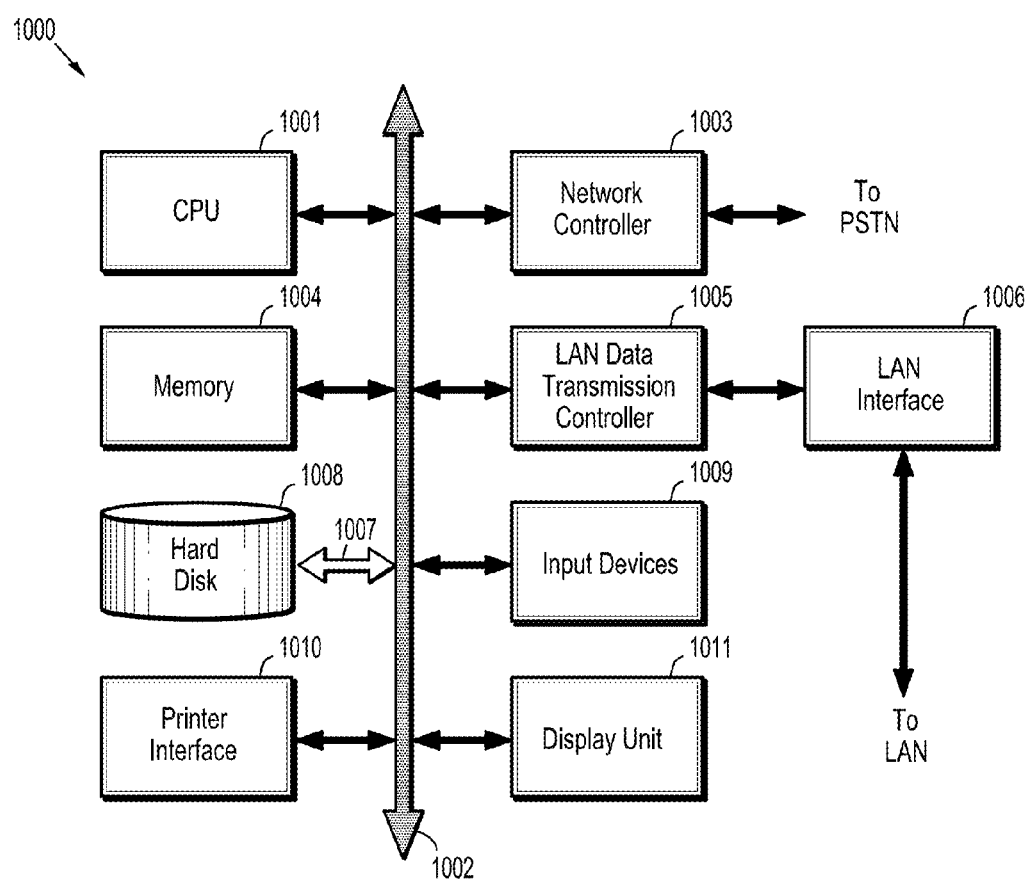
FIG. 9 illustrates an example of a computer system capable of implementing methods and systems according to embodiments of the present invention.

FIG. 9 shows an example of a computer system, which may implement a method and system of the present disclosure. The system and methods of the present disclosure, or part of the system and methods, may be implemented in the form of a software application running on a computer system, for example, a mainframe, personal computer (PC), handheld computer, server, etc. For example, the methods of FIG. 1, FIG. 4a and FIG. 4b may be implemented as software application(s). These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods described above with reference to FIGS. 1-9.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method of deriving blood flow parameters from a moving three-dimensional (3D) model of a blood vessel, the method comprising:
   selecting a first one of a plurality of 3D time-series images of the blood vessel for registration and a second other one of the 3D time-series images for segmentation;
   performing a deformable image registration on the first selected image with respect to the 3D time-series images to generate a displacement field;
   performing a segmentation on the second selected image to generate a 3D model of the blood vessel;
   performing a temporal tracking on the 3D vessel model using the displacement field to generate the moving 3D vessel model;
   determining a reference vascular cross-sectional plane through a location of a lumen in the moving 3D model at one time within the moving 3D model;
   determining a plurality of target vascular cross-sectional planes at multiple times via temporal tracking of the reference vascular cross-sectional plane based on the displacement field;
   determining a plurality of contours based on an intersection of the target vascular cross-sectional planes with the moving 3D vessel model at multiple times within the model wherein each contour corresponds to a different one of the multiple times; and
   determining a blood flow parameter of the vessel from intersections of each contour of a given one of the times with a phase contrast magnetic resonance (PC-MRI) image of the blood vessel from the corresponding time.

2. The method of claim 1, wherein determining the target vascular cross-sectional planes via the temporal tracking comprises adjusting the reference vascular cross-sectional plane by applying transformations using the displacement field to generate the target vascular cross-sectional planes.

3. The method of claim 1, wherein the moving 3D vessel model is derived from magnitude information of an MRI signal.

4. The method of claim 1, wherein the PC-MRI images are derived from phase information of the same MRI signal.

5. The method of claim 1, wherein the intersections are formed by superimposing each contour of a given time at a location within the vessel over the corresponding PC-MRI image of the same time at the same location.

6. The method of claim 1, wherein each PC-MRI image of a given time includes PC-MRI images derived from an X component of phase information of an MRI signal, a Y component of the phase information, and a Z component of the phase information.

7. The method of claim 1, wherein the blood flow parameter is one of flow-rate, average velocity, and peak velocity.

8. The method of claim 1, wherein the method further comprises:
   determining at least one second reference vascular cross-sectional plane through second locations of the lumen in the moving vessel model at the same one time;
   determining a plurality of second vascular cross-sectional planes at multiple times via temporal tracking of the second reference plane based on the displacement field; and
   determining a plurality of new contours based on an intersection of the second vascular cross-sectional planes with the moving 3D vessel model at multiple times within the model wherein each new contour corresponds to a different one of the multiple times,
   wherein the blood flow parameter is further based on second intersections of each new contour with the phase contrast magnetic resonance (PC-MRI) images of the corresponding times.

9. The method of claim 8, wherein the blood flow parameter is pulse wave velocity.

10. The method of claim 9, wherein determining the blood flow parameter comprises:
    determining a distance between one of the contours and one of the new contours of a different location along the blood vessel;
    determining a first flow rate from the intersections;
    determining a second flow rate from the second intersections of the new contours of the different location; and
    determining a pulse wave velocity by dividing the distance by a delay between the first flow rate and the second flow rate.

11. The method of claim 10, wherein the distance is between a point on a centerline of the vessel in one of the contours of a given time and a point on the centerline of the vessel in one of the new contours of the same time.

12. A non-transitory computer readable storage medium embodying instructions executable by a processor to perform method steps for deriving blood flow parameters from a moving three-dimensional (3D) model a blood vessel, the method steps comprising instructions for:

selecting a first one of a plurality of 3D time-series images of the blood vessel for registration and a second other one of the 3D time-series images for segmentation;

performing a deformable image registration on the first selected image with respect to the 3D time-series images to generate a displacement field;

performing a segmentation on the second selected image to generate a 3D model of the blood vessel;

performing a temporal tracking on the 3D vessel model using the displacement field to generate the moving 3D vessel model;

determining a reference vascular cross-sectional plane through a location of a lumen in the moving 3D model at one time within the moving 3D model;

determining a plurality of target vascular cross-sectional planes at multiple times via temporal tracking of the reference vascular cross-sectional plane based on the displacement field;

determining a plurality of contours based on an intersection of the target vascular cross-sectional planes with the moving 3D vessel model at multiple times within the model wherein each contour corresponds to a different one of the multiple times; and determining a blood flow parameter of the vessel from intersections of each contour of a given one of the times with a phase contrast magnetic resonance (PC-MRI) image of the blood vessel from the corresponding time.

13. The method of claim 9, wherein determining the blood flow parameter comprises:

determining distances between one of the contours of a given time and at least two of the new contours of the same time at different respective locations along the blood vessel;

determining a first flow rate from the intersections, and at least two additional flow rates respectively from the second intersections of different locations;

determining time delays between the first flow rate and the additional flow rates; and determining a pulse wave velocity from a slope of a line fitted through a plot of the distances against the time delays.

14. The method of claim 8, wherein the second reference cross-sectional planes are determined by sampling them along a vessel centerline that is part of a 3D segmentation.

15. The method of claim 1, wherein determining the target vascular cross-sectional planes via the temporal tracking comprises determining a reference point on a centerline of the vessel in the reference vascular cross-sectional plane, adjusting the reference point by the respective transformations to generate target reference points, and generating the target vascular cross-sectional planes based on a tangent of each of the target reference points.

16. The computer readable storage medium of claim 12, wherein the method steps further comprises instructions for:

determining at least one second reference vascular cross-sectional plane through second locations of the lumen in the moving vessel model at the same one time;

determining a plurality of second vascular cross-sectional planes at multiple times via temporal tracking of the second reference plane based on the displacement field; and determining a plurality of new contours based on an intersection of the second vascular cross-sectional planes with the moving 3D vessel model at multiple times within the model wherein each new contour corresponds to a different one of the multiple times, wherein the blood flow parameter is further based on second intersections of each new contour with the phase contrast magnetic resonance (PC-MRI) images of the corresponding times.

* * * * *